United States Patent [19]

Power, Jr.

[11] Patent Number: 4,817,744
[45] Date of Patent: Apr. 4, 1989

[54] FRUIT SIZING AND WEIGHING

[75] Inventor: Harry C. Power, Jr., Faber, Va.

[73] Assignee: Powell Machinery, Inc., Faber, Va.

[21] Appl. No.: 171,456

[22] Filed: Mar. 21, 1988

[51] Int. Cl.$^4$ ................ G01G 19/00; G01G 21/22; B65G 15/44; B07C 5/16

[52] U.S. Cl. ................................ 177/145; 177/262; 198/698; 209/592

[58] Field of Search ............... 177/145, 262; 198/504, 198/690.2, 698, 699.1; 209/592-595

[56] References Cited

U.S. PATENT DOCUMENTS

| | | | |
|---|---|---|---|
| 3,489,278 | 1/1970 | Alexander | 209/593 |
| 4,106,628 | 8/1978 | Warkentin et al. | 177/145 X |
| 4,281,764 | 8/1981 | Fowler, Jr. | 198/699.1 X |
| 4,351,429 | 9/1982 | Garrey | 198/690.2 |
| 4,482,061 | 11/1984 | Leverett . | |
| 4,595,091 | 6/1986 | Scopatz et al. . | |
| 4,660,665 | 4/1987 | Powell | 177/145 |

*Primary Examiner*—George H. Miller, Jr.
*Attorney, Agent, or Firm*—Nixon & Vanderhye

[57] ABSTRACT

A simple and inexpensive method and apparatus are provided for weighing product, such as fruits and vegetables, with a separate, simple yet effective method and apparatus for sorting fruits and vegetables having the same characteristics. The weighing apparatus includes a pair of chains having inwardly extending pins engaging vertically elongated slots in lubricating plastic hour glass shaped roller segments. A flat bottom portion of each roller segment engages three rails of a stationary track while the pins engage the elongated slots and move the roller segments over the weighing mechanism. Two or more roller segments engage a fruit or vegetable at the same time, and the stationary track is notched at a load cell so that all of the roller segments supporting a fruit or vegetable operatively engage the load cell at the same time. The product sorter includes a contoured supporting base with a flexible belt on the base and in sliding engagement with it. The flexible belt includes a number of fingers spaced from each other in the dimension of conveyance. The belt may be formed in two sections, one having a roughened surface or shallow flights for engaging the fruits or vegetables. A number of ejectors, each comprising a rotary solenoid with a flipper, are spaced along the length of the supporting base to flex fingers of the belt and move a fruit or vegetable off of the belt and base when actuated.

11 Claims, 3 Drawing Sheets

FRUIT SIZING AND WEIGHING

BACKGROUND AND SUMMARY OF THE INVENTION

While there are known effective mechanisms for accurately weight sizing fruits and vegetables, and the like, such as shown in U.S. Pat. No. 4,660,665, such mechanisms have drawbacks for specific situations. For example, commercial weight sizing and sorting mechanisms typically include a plurality of plastic cups, each cup conveying an individual piece of fruit, or vegetable. Such apparatus typically are quite expensive to build and maintain, and the constant clacking of the product conveying cups can provide a significant noise problem.

According to the present invention, apparatus and method are provided which allow for the inexpensive production of an accurate continuous weighing mechanism for fruits or vegetables, so that a portion of the populous that heretofore could not afford continuous weighing and sizing mechanisms, now can. The apparatus has much less noise associated with it than conventional continuous weight sizers, and is constructed in distinct parts which need not be utilized together. For example the weighing mechanism can be utilized with entirely different sorting apparatus, and the sorting apparatus can be utilized with any type of characteristic-determining apparatus such as a color sorter, digital camera, or a weight sizer.

According to one aspect of the present invention, a product weighing apparatus is provided. The weighing apparatus includes: A weighing mechanism. A plurality of spaced product engaging elements, at least two adjacent elements for engaging each product to be weighed. Conveyance means for conveying the product engaging elements, including a moving conveying mechanism and a stationary track. Means for interconnecting the product engaging elements with the moving conveyance mechanism, so that relative vertical movement therebetween is possible, and means associated with the product engaging elements for sliding on the track means; and the weighing mechanism including a portion of the stationary track means that is vertically movable with respect to the rest of the stationary track means, the portion of the stationary track means shaped and dimensioned so that at least two adjacent product engaging elements, engaging a product to be weighed, are weighed at the same time. The product engaging elements comprise self-lubricating plastic hour glass shaped roller segments. The conveyance moving mechanism comprises a pair of parallel chains while the interconnecting means comprises a plurality of sets of pins extending inwardly from the chains and engaging vertically elongated slots in the roller segments. The stationary track has three rails engaged by a flat bottom portion of the roller segments and the tops of the conveyor chain pins are at the exact level of the top of the tracks. The weighing mechanism, such as a load cell, track portion is positioned adjacent portions of the stationary track which have discontinuities in their track rails to allow effective weighing.

The method of weighing the product according to the present invention comprises the following continuous steps: (a) Supporting each product to be weighed with a plurality of adjacent product engaging mechanisms. (b) Conveying the product conveying mechanisms in a continuous manner over the weighing mechanism; and, (c) supporting the plurality of product engaging mechanisms engaging each product on the weighing mechanism at the same time so as to weigh the product being conveyed.

According to another aspect of the present invention, a product sorting mechanism, which can be utilized with a weight sizer, digital camera, color sorter, or any other product characteristic determining mechanism, is provided. The mechanism comprises: A contoured supporting base. A flexible belt on the contoured base in sliding engagement therewith. Drive means for moving the flexible belt along the supporting base to convey product; and, ejector means for effecting flexing of a portion of the belt at predetermined positions along the supporting base to engage a product and move it off the belt and supporting base. The flexible belt preferably is in two distinct sections, a first section including an edge portion that is formed of a plurality of adjacent but slightly spaced, in the direction of conveyance, fingers, and a drive engaging portion (a V-belt section), while the second section has surface manifestations, such as a textured surface or shallow flights, to positively engage the product. The ejectors each include a flipper elongated in a dimension generally parallel to the direction of conveyance, and a rotary solenoid for effecting movement of the flipper through the contoured supporting base to flex belt fingers.

A method of sorting product using a flexible belt and ejectors, according to the invention, comprises the following steps: Continuously conveying product with the belt in the direction of conveyance; and selectively actuating the ejector elements to engage the flexible fingers of the belt, bending them away from the rest of the belt, to thereby engage the product at the flexible fingers and move the product off of the belt.

It is the primary object of the present invention to provide for effective, yet simple and relatively inexpensive, continuous weighing or sorting of fruits and vegetables and the like. This and other objects of the invention will become clear from an inspection of the detailed description of the invention, and from the appended claims.

DETAILED DESCRIPTION OF THE DRAWINGS

Figure 1:
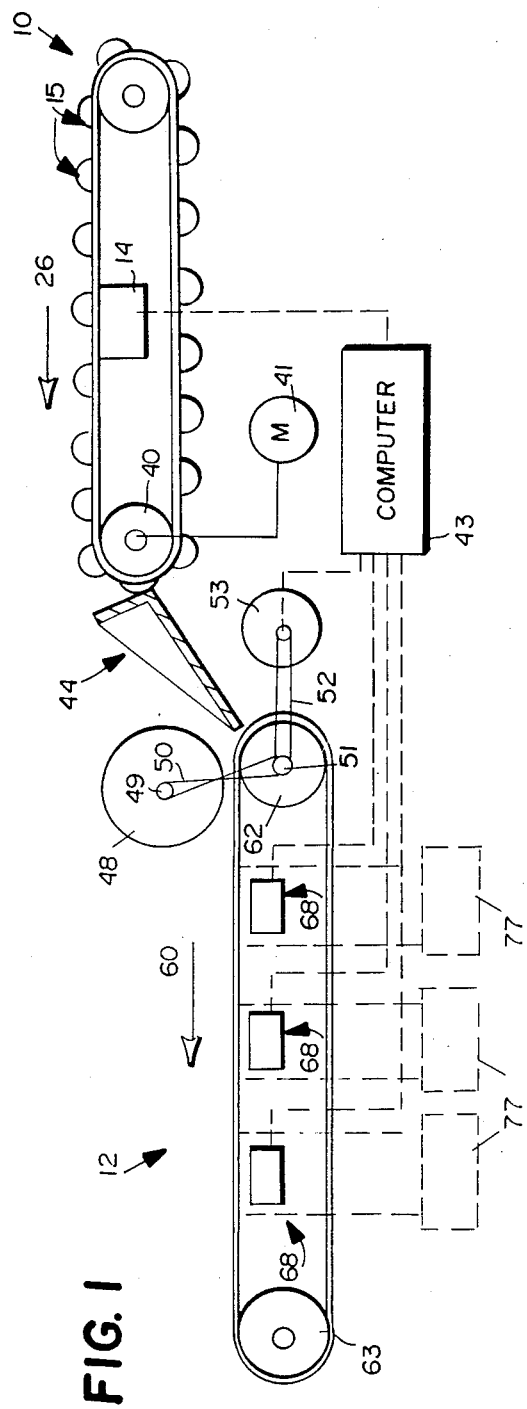
FIG. 1 is a side schematic view of an exemplary product weighing apparatus and product sorting mechanism according to the invention.

A product weighing apparatus according to the present invention is shown generally by reference numeral 10 in FIG. 1, and is illustrated in FIGS. 2 through 5, while a product sorting mechanism according to the present invention is shown illustrated generally by reference numeral 12 in FIG. 1, and illustrated in more detail in FIGS. 6 through 9. While the mechanisms 10, 12, are shown used together in FIG. 1, they may readily be used independently of each other, the weighing mechanism 10 being used with other sorting apparatus, or even for hand sorting, while the sorting mechanism of FIG. 1 can be used with a color sorter, digital camera, or any of a wide variety of other fruit or vegetable characteristic determinators. The apparatus of FIG. 1 is primarily useful in the sorting of fruits and vegetables, such as apples, peaches, oranges, sweet potatoes, etc. However, the mechanisms may also have applicability to other products which have characteristics not too dissimilar to fruits and vegetables.

The apparatus 10 includes a load cell 14, or a like weighing mechanism. A plurality of spaced product engaging elements, shown generally by reference numeral 15, are associated with the load cell 14 for continuously conveying product past the load cell 14. As seen most clearly in FIGS. 2 through 4, the spaced product engaging elements 15 may comprise hour glass shaped roller segments, having a visible portion which is approximately half of an hour glass shaped roller. Note that the end portions 16 of each roller segment 15 neck down to a smaller central section 17. The roller segments 15 are preferably made of a self-lubricating plastic, such as nylon or UHMW (a polyethylene).

The roller segments 15 include a flat bottom surface 18 adapted to engage a stationary track 20 and slide therealong, and has a pair of downwardly extending flanges 20 each with a vertically elongated slot 21 defined therein. The elements 15 are disposed along the mechanism 10 so that at least two adjacent elements engage a product to be conveyed. For example in FIG. 2, adjacent elements 23, 24 are shown engaging an apple 25. Where the product being engaged is elongated, such as a sweet potato, then three, or even more, elements 15 may engage the product, and the track at the load cell 14 will be designed to accommodate such a product.

Figure 5:
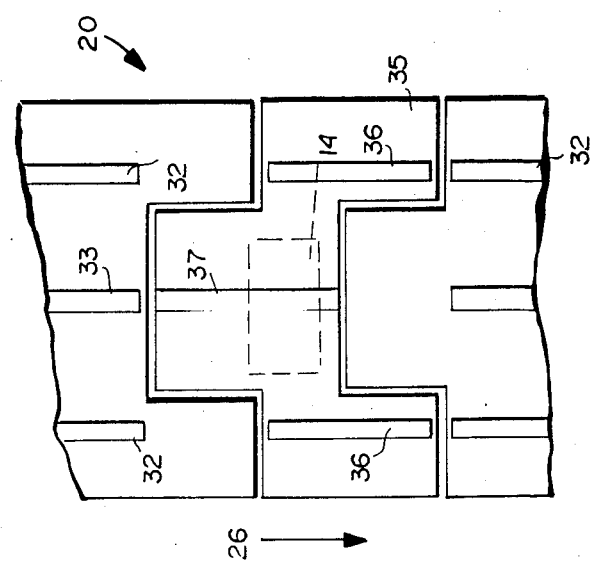
FIG. 5 is a top plan view of the stationary track of the apparatus of FIGS. 1 through 3 at the load cell.
Figure 4:
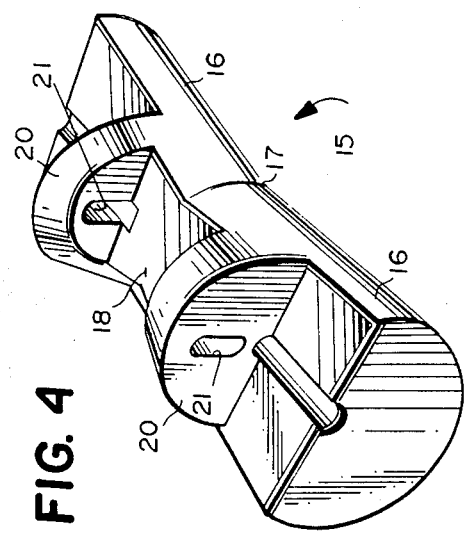
FIG. 4 is a bottom perspective view of one of the roller segments of the weighing apparatus of FIGS. 1 through 3.
Figure 2:
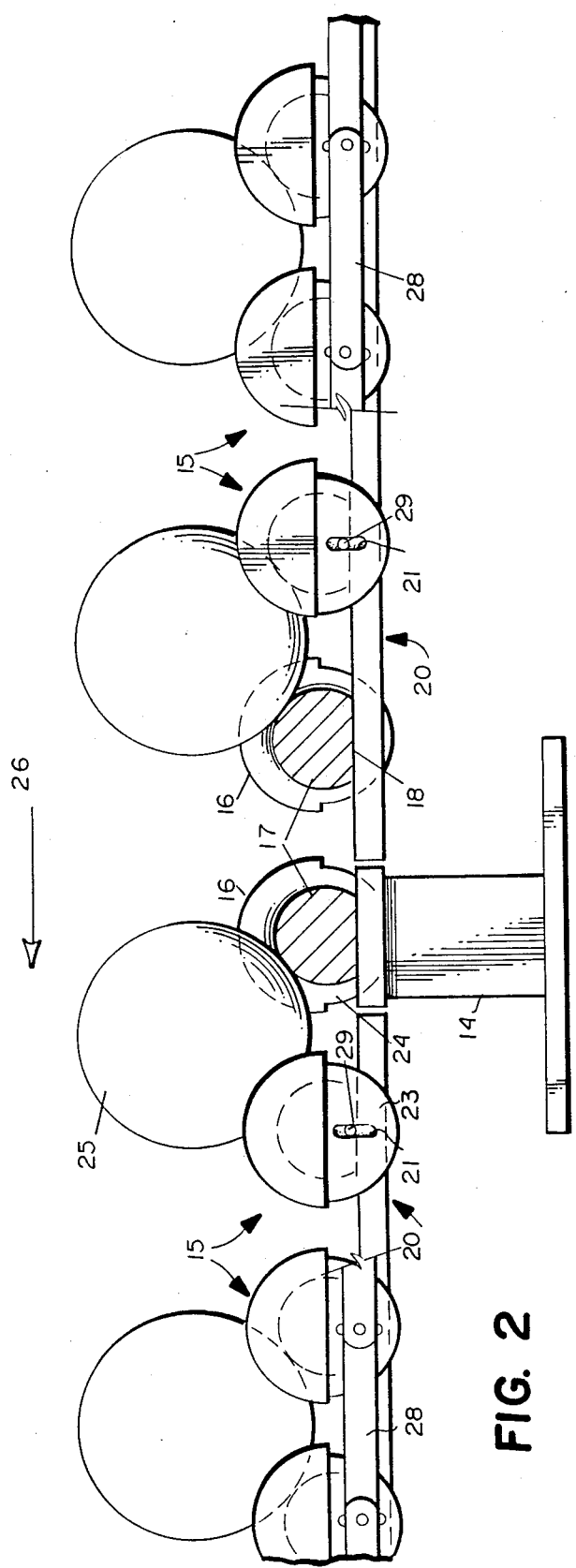
FIG. 2 is a detail side view, partly in cross-section and partly in elevation, of the operative components of the weighing apparatus.
Figure 3:
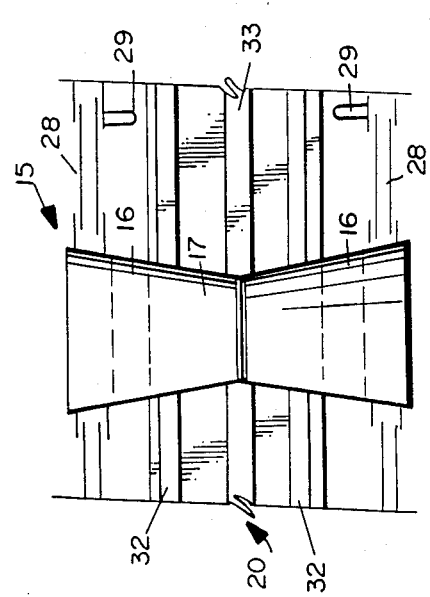
FIG. 3 is a detail top plan view of a portion of the apparatus of FIG. 2.

The apparatus 10 includes as another important element a conveyance means for conveying the elements 15 in the direction of conveyance 26 (see FIGS. 2 and 5). The conveyance mechanism includes the stationary track 20, as well as a movable conveyance mechanism. The preferred form of the movable conveyance mechanism is a pair of spaced, parallel roller chains 28 (see FIGS. 2 and 3), the chains 28 having operatively aligned pins 29 extending inwardly therefrom. The pins 29 are disposed in elongated slots 21 of a cooperating element 15, the pins 29 having a maximum dimension which is much less than the vertical elongation of the slots 21, as can be clearly seen in FIG. 2.

The stationary track 20 preferably comprises a plurality (e.g. three) of upstanding rails, such as a pair of outer upstanding rails 32 and an inner upstanding rail 33 as illustrated in FIG. 5. The rails 32 are spaced from each other a dimension less than the width of the flat section 18 on the bottom of the elements 15. During the majority of the length of the mechanism 10, the surfaces 18 of the elements 15 will engage all three rails 32, 33, however at the load section 14 the arrangement changes in order to ensure that both (or all) of the elements 15 engaging the product 25 to be weighed are in operative association with the load cell 14 at the same time, and so that the load cell will accurately weigh the product (and associated roller segments 15). This is accomplished by providing a portion 35 of the stationary track 20 that is connected to the load cell 14, and is movable vertically with respect to the stationary track 20, and includes rail segments 36, 37 therealong. The rails 32 are discontinued at one end of the structure 35, while the central rail 33 is discontinued at the other end of the structure 35.

The construction of the structure 35, as clearly seen in FIG. 5, is such that both, or all (depending on the dimensions of the components in the structure 35) of the elements 15 supporting a product 25 being weighed are in engagement with the weigh cell 14 at the same time. For example with reference to FIG. 2, when the apple 25 is being weighed, both the roller segments 23, 24 are supported by the structure 35 and do not have any portion thereof supported by the stationary track 20. The flat bottom portion 18 of the element 23 is supported by the track segments 36, while the flat bottom portion 18 of the element 24 is supported by the track segment 37. At this juncture, the conveyor chains 28 do not in any way support the elements 15, but rather they may freely move vertically due to the lost motion connection between the pins 29 and the slots 21.

Note that the chains 28 are driven in any conventional manner, as with a sprocket 40 driven by a motor 41 (see FIG. 1). Also, for many situations it will be desirable to feed to, and/or store, the weight signal from the load cell 14 in a computer 43.

The product sorting mechanism 12 may cooperate with the product weighing apparatus 10. For this purpose, an intermediate chute 44 may be provided, or alternatively structures can be designed so that the discharge end of the apparatus 10 may be bolted directly at the infeed end of the apparatus 12.

The product sorting mechanism 12 has at the infeed end thereof a deflated tire 48 (or a brush or the like) which may be driven through a pulley 49 and belt 50 by a shaft 51 which in turn is driven by a chain 52 connected to a motor 53. The deflated tire 48 is disposed above a contoured supporting base 55 (see FIGS. 7 and 9) which preferably comprises a piece or pieces of sheet metal disposed in a generally trough configuration (e.g. roughly a V-shape) so as to contain product being sorted therewithin.

Figure 6:
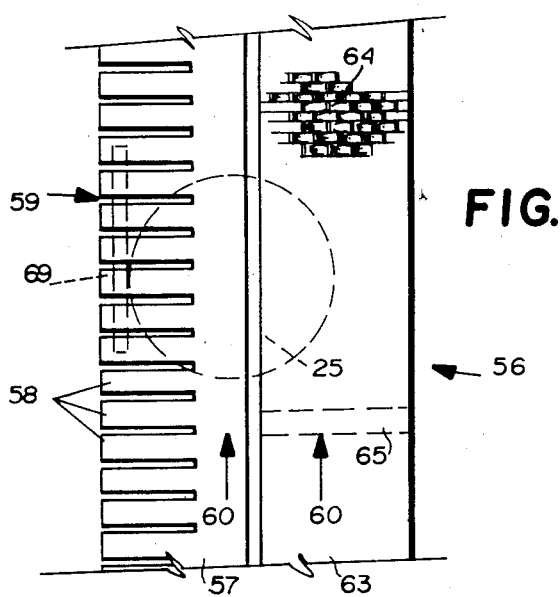
FIG. 6 is a top plan view of an exemplary belt according to the invention at an ejector station.
Figure 7:
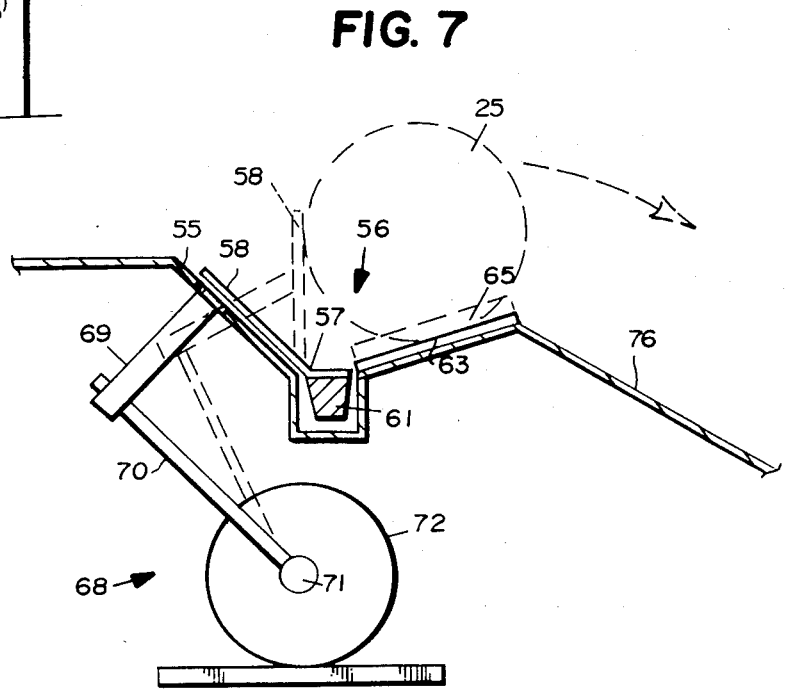
FIG. 7 is an end view, partly in cross-section and partly in elevation, of the apparatus of FIG. 6 at an ejector station.

The mechanism 12 further comprises a flexible belt 56 which is disposed on the contoured base 55 and is in generally sliding engagement with it. The flexible belt may be formed in one piece, but preferably is formed in two sections as illustrated in FIGS. 6 and 7. For example the flexible belt, shown generally by reference numeral 56, includes a first section 57 which has an edge portion formed by a plurality of fingers 58 which are slightly spaced from each other (see spaces 59) in the direction of conveyance 60. The section 57 also includes a drive portion 61 (see FIG. 7) which is adapted to engage shives 62, 63 at either end of the mechanism 12, and provides for driving of the flexible belt 56 in the direction of conveyance 60. The particular material of which the belt section 57 is constructed is not particularly critical. Normally, of course, the V-belt portion 61 would be of rubber, or the like, as is conventional for V-belts, while the portion 58 could be attached by adhesive to the portion 61, and may be of an elastomer impregnated fabric, or the like. All that is necessary is that the belt be properly driven and that the belt be flexible, the portions (fingers) 58 being ideally flexible.

The belt 56 also preferably includes the second section 63, which typically is flat and need not be segmented into the fingers or the like. For example section 63 can be a conventional nylon belt, or a belt of like material. It is highly desirable, to prevent significant rolling in the dimension of conveyance of product that may be round (such as oranges), that the product engaging surface of the belt section 63 have surface manifestations. For example the top surface of the belt 63 may be textured, having a plurality of peaks and valleys, as illustrated generally by reference numeral 64 in FIG. 6. Alternatively, or in addition, shallow flights 65 (shown at dotted line in FIGS. 6 and 7) may be provided.

The shive 62 comprises, in cooperation with the drive portion 61 of the belt 56, a drive means for moving the flexible belt along the supporting base 55 to convey apples 25, or like product, in the dimension 60. The mechanism 12 also includes ejector means, shown generally by reference numeral 68 (see FIG. 7 for example) for effecting flexing of a portion of the belt at predetermined positions along the supporting base to engage the product 25 and move it off of the base 55. In FIG. 1, three exemplary such ejector means are shown spaced along the length of the mechanism 12, but of course the mechanism 12 can be dimensioned so as to have any number of ejector stations.

Figure 8:
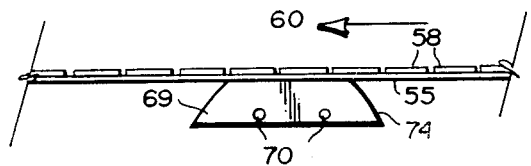
FIG. 8 is a side view of the ejector flipper of FIG. 7.

The preferred form of ejector means comprises a flipper 69 which is attached by one or more rods 70 to a shaft 71 of a rotary solenoid 72. The flipper 69 is preferably ramped, having the tapered leading edge 74 (see FIG. 8) so as to make as smooth a transition as possible of the fingers 58 between a normal and flexed positions when the flipper 69 is actuated. As illustrated in FIG. 8, preferably both ends of the flipper 69 are ramped so that the flippers are interchangeable, for right and left hand mechanisms 12, and if the ramp 74 should wear out the flipper 69 may merely be reversed.

Figure 9:
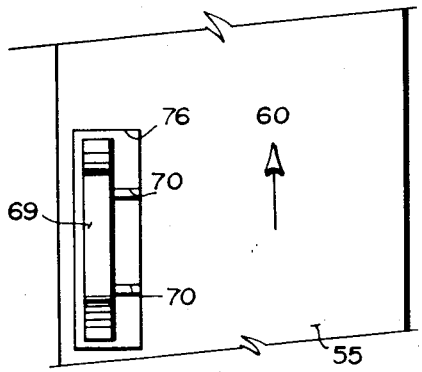
FIG. 9 is a top plan view, with the belt removed for clarity of illustration, of the apparatus of FIG. 7 at an ejector station.

The flipper 69 is mounted below the contoured base 55, as seen in FIGS. 7 through 9 so that it moves through a slot 76 formed in the base 55, and elongated in the dimension of conveyance 60. When the rotary solenoid 72 is actuated, the shaft 71 rotates, causing the flipper 69 to move from the solid line to the dotted line position in FIG. 7, and thereby flexing a plurality of fingers (as illustrated in FIG. 6 the flipper 69 top surface is longer than a plurality of fingers 58 are wide), to operatively engage the piece of fruit 29 through the fingers 58 and thereby cause the piece of fruit 25 to be discharged from the belt 56 and contoured supporting base 55 to an off ramp 76 which leads to a conveyor belt, bin, or like discharge station 77 (see FIG. 1).

Exemplary apparatus according to the invention having been described, an exemplary manner of operation thereof will now be set forth. The manner of operation and method according to the invention will be described with respect to the weighing and sorting of apples, but it is to be understood that other products are also within the scope of the invention.

Apples to be weighed are disposed at the right end (in FIG. 1) of the apparatus 10, with each apple supported between two adjacent roller segments 15, and no roller segment 15 engaging more than one apple 25. The motor 41 powers the sprocket 40 to move the chains 28 in the direction 26. As the chains 28 power the elements 15 in direction 26, with the pins 29 in slots 21, the flat bottom surfaces 18 of the elements 15 engage the tops of rails 32, 33. When an individual apple 25 moves onto the structure 35 associated with the load cell 14, both roller segments supporting it (e.g. segments 23, 24 for apple 25 in FIG. 2) are on the structure 35 at the same time, and are not in any way supported by the stationary rail 20 or the chains 28 at that instant, the pins 29 floating in the slots 21. A weight signal from the load cell 14 may be conveyed to the computer 43, and used to control subsequent sorting operations, such as the ejectors 68.

From the left end of the apparatus 10 (in FIG. 1) the apples are discharged to the infeed end (right side of structure 12 in FIG. 1) of the mechanism 12, the deflated tire 48 being moved at the same speed as the flexible belt 56 by the powered shive 62, to move the apples in spaced relationship along the mechanism 12 in direction 60. When an apple of a predetermined desired weight at a particular station 77 reaches the ejector 68 associated with that station, the solenoid 72 is operated by the computer 43 to effect rotation of the flipper 69 associated with that ejector 68. The flipper 69 passes through the slot 76 in the supporting base 55, the ramped portions 74 thereof smoothly engaging the fingers 58 of the belt section 57 and causing them to flex without catching, and thereby causing the apple 25 to move over the belt section 63 and be discharged onto the ramp 76.

It is to be understood that any type of characteristic determining apparatus, or even conceivably a manned control panel, can be associated with the mechanism 12 for actuating the ejectors 68, and this invention does not relate to the specific manner in which the ejectors 68 are controlled.

While the invention has been herein shown and described in what is presently conceived to be the practical and preferred embodiment thereof, it will be apparent to those of ordinary skill in the art that many modifications may be made thereof within the scope of the invention, which scope is to be accorded the broadest interpretation of the appended claims so as to encompass all equivalent structures and processes.

What is claimed is:

1. A product weighing apparatus comprising:
    a weighing mechanism;
    a plurality of spaced separate and distinct product engaging elements, any two or more adjacent elements for engaging each product to be weighed;
    conveyance means for conveying said product engaging elements, including a moving conveying mechanism and a stationary track;
    means for interconnecting said product engaging elements with said moving conveyance mechanism, so that relative vertical movement therebetween is possible, and means associated with said product engaging elements for sliding on said track means; and
    said weighing mechanism including a portion of said stationary track means that is vertically movable with respect to the rest of said stationary track means, said portion of said stationary track means shaped and dimensioned so that at least two adjacent product engaging elements, engaging a product to be weighed, are weighed at the same time.

2. Apparatus as recited in claim 1 wherein said product engaging elements each comprise a segment of an hour glass shaped roller.

3. Apparatus as recited in claim 2 wherein said segment of an hour glass shaped roller is made of a self-lubricating plastic.

4. Apparatus as recited in claim 2 wherein said moving conveyance mechanism comprises a pair of spaced parallel driven chains; and wherein said means for interconnecting said product engaging elements with said moving conveyance mechanism comprises a plurality of pins extending inwardly from said chains, the pins on said respective chains being in aligned pairs, and said pins received in elongated vertical slots in said roller segments, said slots vertically elongated a dimension much larger than the maximum dimension of said pins.

5. Apparatus as recited in claim 4 wherein said stationary track comprises three rails upstanding therefrom, and wherein said means associated with each said product engaging element for sliding on said track means comprises a flat surface of said roller segment which engages said rails.

6. Apparatus as recited in claim 5 wherein the tops of said pins are at essentially the exact level of the tops of said tracks, and said flat surface of each roller segment is at the level of the top of each slot.

7. Apparatus as recited in claim 1 wherein said conveyance moving mechanism comprises a pair of parallel driven chains; and wherein said means for interconnecting said conveyance moving mechanism to said product engaging elements comprises a plurality of inwardly extending pins associated with each chain, and vertically elongated slots formed in said product engaging elements, a pin from each chain disposed within an elongated slot of each product engaging element, said slots vertically elongated to have a dimension much greater than the maximum dimension of said pin.

8. A method of weighing fruits or vegetables utilizing a plurality of discrete separate and distinct product engaging elements and a weighing mechanism, comprising the steps of continuously:
(a) supporting each product to be weighed with a plurality of any adjacent product engaging mechanisms;
(b) conveying said product conveying mechanisms in a continuous manner over the weighing mechanism;
(c) supporting the plurality of product engaging mechanisms engaging each product on the weighing mechanism at the same time so as to weigh the product being conveyed.

9. A product weighing apparatus comprising:
a weighing mechanism;
a plurality of spaced product engaging elements, at least two adjacent elements for engaging each product to be weighed;
conveyance means for conveying said product engaging elements, including a moving conveying mechanism and a stationary track, and comprising a pair of parallel driven chains;
means for interconnecting said product engaging elements with said moving conveyance mechanism, so that relative vertical movement therebetween is possible, and means associated with said product engaging elements for sliding on said track means; and
said weighing mechanism including a portion of said stationary track means that is vertically movable with respect to the rest of said stationary track means, said portion of said stationary track means shaped and dimensioned so that at least two adjacent product engaging elements, engaging a product to be weighed, are weighed at the same time; and
wherein said means for interconnecting said conveyance moving mechanism to said product engaging elements comprises a plurality of inwardly extending pins associated with each chain, and vertically elongated slots formed in said product engaging elements, a pin from each chain disposed within an elongated slot of each product engaging element, said slots vertically elongated to have a dimension much greater than the maximum dimension of said pin.

10. Apparatus as recited in claim 9 wherein said stationary track comprises three upstanding rails which engage a bottom flat surface of said product engaging element; and wherein the tops of said pins are at essentially the exact level of the tops of said rails.

11. A product weighing apparatus comprising:
a weighing mechanism;
a plurality of spaced product engaging elements, any two adjacent elements for engaging each product to be weighed;
conveyance means for conveying said product engaging elements, including a moving conveying mechanism and a stationary track;
means for interconnecting said product engaging elements with said moving conveyance mechanism, so that relative vertical movement therebetween is possible, and means associated with said product engaging elements for sliding on said track means; and
said weighing mechanism including a portion of said stationary track means that is vertically movable with respect to the rest of said stationary track means, said portion of said stationary track means shaped and dimensioned so that any two adjacent product engaging elements, engaging a product to be weighed, are weighed at the same time, and including at least three rails upstanding therefrom for engagement by said product engaging elements.

* * * * *